E. I. DODDS.
STAY BOLT.
APPLICATION FILED SEPT. 21, 1912.
1,077,045.
Patented Oct. 28, 1913.
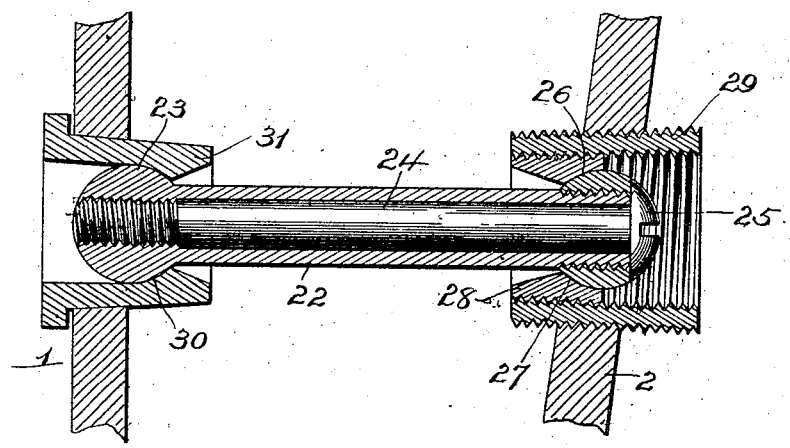

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,045.  Specification of Letters Patent.  Patented Oct. 28, 1913.

Original application filed September 25, 1911, Serial No. 651,051. Divided and this application filed September 21, 1912. Serial No. 721,667.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051 filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, permitting the sheets to expand and contract at will.

Another object of the invention is to provide a stay-bolt that can readily be applied from the inside without the trouble and expense of dismantling the engine, and that can be adjusted at any time, if necessary.

The accompanying drawing is a view in longitudinal section of a bolt embodying my invention.

1 represents the inside plate of a locomotive boiler, 2 the outside plate, and 29 and 31 bushings secured within holes in said plates. The bushing 31 is cone shape and is set into the hole in the outer plate 1 and is provided with an integral curved bearing 30 for the rounded head of the bolt, and bushing 29 is screw threaded externally for engagement with the threaded hole in the outer plate, and is also threaded internally for the attachment of the bushing 28 through which the bolt passes, and which is also provided with a curved seat for the rounded head of the bolt, the opening at the opposite end of said bushing being flaring to permit of the free movement of the bolt.

The bolt 22 comprises a hollow member having a spherical head 23 integral at one end, and a solid member 24 telescoping with the hollow member 22, and formed with a head 25 at one end and threaded at its opposite end, the threaded end of the inner or solid member engaging internal threads formed within the hollow member. One end of the outer member 22 is threaded to receive the spherical nut 26, which with the head 25 of the inner member forms a ball joint member engaging the seat 27 in the inner bushing 28. The head 25, resting against the spherical nut 26 screwed to the outer member of the bolt operates to prevent the latter working loose.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but Having fully described my invention what I claim as new and desire to secure by Letters-Patent, is:—

1. A stay bolt comprising an outer section having an integral head, and an inner section provided at one end with a head and threaded at its opposite end, the threaded end of the inner section engaging female threads on the outer section.

2. A stay bolt comprising an outer section carrying two spherical heads one of which is detachable, and an inner section telescoping with the outer section and provided with a head which forms an abutment for the removable head of the outer section.

3. A stay bolt comprising an outer section carrying two spherical heads one of which is integral and the other detachable and an inner section telescoping with the outer section and provided with a head which forms an abutment for the removable head of the outer section.

4. A stay bolt comprising an outer section carrying two heads one of which is detachable, and an inner section telescoping with the outer section and provided with a head resting in contact with said detachable head and shaped to complete the spherical form of the latter.

5. A stay bolt comprising an outer section provided with two heads, and an inner section provided with a head at one end and screw threaded at the other end the said screw threaded end engaging internal threads in the outer section.

In testimony whereof, I have signed this specification in the presence of two subscribing witnesses.

ETHAN I. DODDS.

Witnesses:
 A. W. BRIGHT,
 GEO. F. DOWNING.